(12) United States Patent
Kajiwara et al.

(10) Patent No.: US 6,251,353 B1
(45) Date of Patent: *Jun. 26, 2001

(54) PRODUCTION METHOD OF SILICON CARBIDE PARTICLES

(75) Inventors: Meisetsu Kajiwara, Nagoya; Masao Hashimoto, Kodaira; Hiroaki Wada, Kawasaki, all of (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/916,638

(22) Filed: Aug. 22, 1997

(30) Foreign Application Priority Data

Aug. 26, 1996  (JP) .................................... 8-224246

(51) Int. Cl.⁷ .................................... C01B 31/36
(52) U.S. Cl. ........................ 423/345; 423/346; 501/88
(58) Field of Search .................. 423/345, 346, 423/349, 439, 440; 501/88

(56) References Cited

U.S. PATENT DOCUMENTS

| | | | |
|---|---|---|---|
| 4,500,504 | * 2/1985 | Yamamoto | 423/345 |
| 4,502,983 | * 3/1985 | Omori et al. | 252/516 |
| 4,513,030 | * 4/1985 | Milewski | 427/227 |
| 4,569,921 | * 2/1986 | Omori et al. | 501/88 |
| 4,795,673 | * 1/1989 | Frechette et al. | 428/331 |
| 4,818,732 | * 4/1989 | Fox et al. | 501/81 |
| 4,904,622 | * 2/1990 | Dubots et al. | 501/88 |
| 4,948,573 | * 8/1990 | Nadkarni et al. | 423/291 |
| 5,059,578 | * 10/1991 | Maruno et al. | 502/432 |
| 5,093,039 | * 3/1992 | Kijima et al. | 252/516 |
| 5,104,925 | * 4/1992 | Honda et al. | 524/517 |
| 5,132,255 | * 7/1992 | Takeuchi et al. | 501/94 |
| 5,221,296 | * 6/1993 | Schwerzel et al. | 51/298 |
| 5,318,761 | * 6/1994 | Kojima et al. | 423/345 |
| 5,332,523 | * 7/1994 | Igarashi et al. | 252/309 |
| 5,589,116 | * 12/1996 | Kojima et al. | 264/65 |
| 5,863,325 | * 1/1999 | Kanemoto et al. | 117/105 |
| 6,001,756 | * 12/1999 | Takahashi et al. | 501/90 |

FOREIGN PATENT DOCUMENTS

| | | |
|---|---|---|
| 2301349 | 12/1996 | (GB) . |
| B2-1-42886 | 9/1989 | (JP) . |
| 9-48605 | 2/1997 | (JP) . |

* cited by examiner

*Primary Examiner*—Wayne A. Langel
*Assistant Examiner*—Cam N. Nguyen
(74) *Attorney, Agent, or Firm*—Oliff & Berridge, PLC

(57) ABSTRACT

The present invention is to provide a production method of silicon carbide particles of high quality without generating a sulfur compound in the carbonizing and baking processes. More concretely, a production method of silicon carbide particles comprising a step of mixing at least one kind of a silicon compound, which is liquid at ordinary temperatures, an organic compound having a functional group, which generates carbon by heating and is liquid at ordinary temperatures, and a polymerization or crosslinking catalyst, which can homogeneously dissolve with the organic compound to obtain a mixture, a step of homogeneously solidifying the mixture to obtain solid matter, and a step of heating and baking the solid matter in a non-oxidizing atmosphere, wherein the catalyst is a compound consisting of carbon atoms, hydrogen atoms and oxygen atoms, and has a carboxyl group.

31 Claims, No Drawings

PRODUCTION METHOD OF SILICON CARBIDE PARTICLES

BACKGROUND OF THE INVENTION

1. Field of the Invention

The present invention relates to a production method of silicon carbide particles, more specifically to a production method of silicon carbide particles not generating a sulfur compound derived from a hardening polymerization catalyst.

2. Description of the Related Art

As a production method of silicon carbide, conventionally the Atison method for obtaining silicon carbide particles using quartz sand and petroleum coke as the materials is known. It is known that according to the method, since many impurities are present in the above-mentioned materials, the silicon carbide particles obtained are not sufficiently pure, when using in sintered body material, many disadvantages in the various characteristics appear due to impurities in the sintered bodies. Thus they are not appropriate for the production of high purity sintered bodies.

As a method of producing silicon carbide particles of high purity, a method of using a high purity liquid type silicon source and a liquid type carbon source as the materials is disclosed in Japanese Patent Application Publication (JP-B) No. 1-42886.

In this method, toluene sulfonic acid is conventionally selected as a strong non-metallic acid in consideration of the strength of the pKa. However, it has a disadvantage in that equipment and a process are required for treating gases of sulfur compounds such as SO and $SO_2$ generated and continuously discharged outside the furnace in the carbonizing and baking processes.

SUMMARY OF THE INVENTION

Accordingly, an object of the present invention is to provide a production method of high quality silicon carbide particles without generating sulfur compounds in the carbonizing and baking processes in the above-mentioned production method of silicon carbide of high purity.

The present inventors earnestly studied the mechanism of generation of the sulfur compound and found a method of homogeneously generating the hydrolysis and polymerization reaction without using a sulfur-containing catalyst represented by toluene sulfonic acid used in the production method of silicon carbide.

That is, a production method of silicon carbide of the present invention comprises a step of mixing at least one kind of silicon compound, liquid at room temperature, an organic compound having a functional group, which generates carbon upon heating and is liquid at room temperature, and a polymerization or crosslinking catalyst, which can homogeneously dissolve with the organic compound to obtain a mixture, a step of homogeneously solidifying the mixture to obtain a solid matter, and a step of heating and baking the solid matter in a non-oxidizing atmosphere, wherein the catalyst is a compound consisting of carbon atoms, hydrogen atoms and oxygen atoms, and has a carboxyl group.

More concretely, the catalyst is a compound having a carboxyl group, and is preferably at least one type selected from the group consisting of maleic acid and a derivative thereof.

It is preferable that the solid matter is previously heated and carbonized in a non-oxidizing atmosphere before heating and baking in the production method. Furthermore, it is preferable that the mixture further comprises a surfactant.

According to the method of the present invention, silicon carbide of high purity can be produced without generating a sulfur compound in the carbonizing and baking processes. Furthermore, the method of the present invention is preferable also from the viewpoint of environmental conservation.

DESCRIPTION OF THE PREFERRED EMBODIMENTS

Now the present invention will be described in more detail.

Silicon carbide particles of the present invention can be produced by heating and baking in a non-oxidizing atmosphere a mixture obtained by homogeneously mixing a liquid silicon compound, a liquid organic compound having oxygen in its molecular structure, which generates carbon upon heating (hereinafter optionally referred to as "carbon source"), and a polymerization or crosslinking catalyst, which homogeneously dissolves at least with the organic compound, and can be obtained preferably by a production method comprising a solidifying step of solidifying the mixture to obtain a solid matter, and a baking step of baking the solid matter in a non-oxidizing atmosphere. It is more preferable to further comprise a step of heating and carbonizing the obtained solid matter in a non-oxidizing atmosphere between the solidifying step and the baking step.

As a silicon source used in the production method of silicon carbide particles, at least one selected from the group consisting of tetraalkoxy silane of high purity, a polymer thereof, and silicon oxide is used. "Silicon oxide" in the present invention includes silicon dioxide and silicon monoxide. Concrete examples of a silicon source include alkoxy silanes represented by tetraethoxy silane, low molecular weight polymers (oligomers) thereof, silicic acids of a high polymerization degree, and silicon oxide compounds such as silica sol and fine particle silica. Examples of alkoxy silanes include methoxy silane, ethoxy silane, propoxy silane, and butoxy silane. Among these examples, ethoxy silane is preferably used in view of easy handling. "Oligomer" herein refers to a polymer of 2 to 15 polymerization degree.

Among these silicon sources, an oligomer of tetraethoxy silane and a mixture of an oligomer of tetraethoxy silane and fine particle silica are preferable in view of good homogeneity and handling. It is preferable to use a material of high purity as the silicon source according to the application. In this case, the initial impurity content is preferably 20 ppm or less, more preferably 5 ppm or less.

Concrete examples of materials used as an organic compound for generating carbon by heating, to be mixed with the above-mentioned silicon source include various saccharides such as monosaccharides including glucose, oligosaccharides including cane sugar, and polysaccharides including cellulose and starch; and coal tar pitch having a high actual carbon ratio; phenol resin; furan resin; epoxy resin; and phenoxy resin. Among these examples, those which are liquid at an ordinary temperature, those capable of dissolving with a solvent, those which soften upon heating, such as thermoplastic or heat-fusable ones or become liquid upon heating are preferably used for homogeneous mixing with a silicon source. In particular, compounds having a high actual carbon ratio, polymerized or crosslinked by a catalyst or heating, consisting of carbon atoms, hydrogen atoms and oxygen atoms are preferable. Concrete preferable examples thereof include phenol resin, polyvinyl alcohol, polyvinyl acetate.

The ratio of carbon and silicon (hereinafter abbreviated as "C/Si ratio") in the production of silicon carbide particles, which are material particles of the present invention can be defined by elemental analysis of a carbide intermediate obtained by carbonizing the mixture. Free carbon in generated silicon carbide should be 0% when the C/Si ratio is 3.0 in stoichiometry. However, actually free carbon generates at a low C/Si ratio due to the vaporization of SiO gas generated at the same time. It is important to previously determine the proportion so that the free carbon amount in the generated silicon carbide particles is not inappropriate. In general, free carbon can be maintained at a C/Si ratio of 2.0 to 2.5 in the case of baking at 1600° C. or higher at about 1 atmospheric pressure, and thus the range can be preferably used. With a C/Si ratio of more than 2.5, although free carbon significantly increases, since the free carbon has an effect of restraining the grain growth, it may be optionally selected according to the purpose of the grain formation. However, in the case of baking under low or high atmospheric pressure, the C/Si ratio for obtaining pure silicon carbide fluctuates, so in this case the C/Si ratio is not always limited to the above-mentioned range.

In the method of the present invention where a mixture is obtained by thoroughly mixing the above-mentioned silicon compound, which is liquid at ordinary temperatures, and the carbon source, before mixing a catalyst capable of homogeneously dissolving with these compounds, it is preferable to add the catalyst after stirring these materials well.

It is characteristic of the production method of the present invention to homogeneously dissolve at least with an organic compound and use a compound consisting of carbon atoms, hydrogen atoms and oxygen atoms as a catalyst. The compound consists of carbon atoms, hydrogen atoms and oxygen atoms, and since it does not contain a sulfur atom unlike toluene sulfonic acid ($C_7H_8O_3S$), which is a conventional commonly-used catalyst, hazardous sulfur compounds are not generated in the heating and baking processes. Conventional catalysts not containing a sulfur atom have difficulty in homogeneous mixing of a nonaqueous and hydrophilic material, and thus cannot be used appropriately. However, since a certain catalyst used in the present invention can homogeneously dissolve with an organic compound to be used for reaction, it has good homogeneity. Furthermore, it was found that compounds containing carboxylic groups are preferable in view of the improvements in reactivity. "Dissolve with an organic compound" in the present invention means to become homogeneous at a molecular level by mixing with an organic compound.

The compound containing a carboxyl group may include a saturated or unsaturated carboxylic acid, dicarboxylic acid and aromatic carboxylic acid, preferably saturated aliphatic dicarboxylic acid, unsaturated aliphatic carboxylic acid and derivatives thereof. Preferable examples of a catalyst include maleic acid (pKa=1.75), acrylic acid (pKa=4.26), oxalic acid ($pKa_1$=1.04, $pKa_2$=3.82), itaconic acid ($pKa_1$=3.85, $pKa_2$=5.45), malonic acid ($pKa_1$=2.65, $pKa_2$=5.28), and succinic acid($pKa_1$=4.00, $pKa_2$=5.24). Among these examples, at least one selected from the group consisting of maleic acid and a derivative thereof is preferable in view of pKa and solubility in water. Examples of maleic acid derivatives include maleic anhydride. Examples of aromatic carboxylic acids may include salicylic acid (pKa=2.81), phenoxyacetic acid (pKa=2.99), phthalic acid (pKa=2.75) and the like.

As an example of a catalyst of the present invention, maleic acid has advantages including (1) a pKa value (pKa=1.75) comparable to a pKa value of toluene sulfonic acid (pKa=1.4), and thus having acid strength, (2) inclusion of both an unsaturated bond and a carboxyl group in a molecule, and thus having affinity between a hydrophobic portion and a hydrophilic portion to facilitate homogeneous mixing of a silicon source and a carbon source, and (3) mild hardening reaction owing to the reaction, which is not a strong exothermic reaction, and thus capable of controlling the reaction rate by the amount of the catalyst.

The proportion ratio of the mixture used in the production method of the present invention preferably includes 40 to 60 parts by weight of a carbon source, 5 to 10 parts by weight of a catalyst with respect to 100 parts by weight of the silicon source. A catalyst may be provided in a state being dissolved in a solvent containing no impurities, for example, as a saturated solution of water or acetone. Since homogeneously mixing the mixture is an important step for the homogeneous reaction in the subsequent heating and baking processes, a surfactant may be added optionally to the mixture according to the degree of homogeneity of the mixture. Examples of surfactants usable herein include SPAN 20, a sorbitan monolaurate and TWEEN 20, a poly (oxyethylene) sorbitan, both manufactured by Kanto Chemical Co., Inc. An amount thereof is preferably about 5 to 10% by weight with respect to the total amount of the mixture.

A mixture homogenized by stirring as mentioned above is solidified. As a solidifying method, heating can be applied in addition to stirring after adding a catalyst. A step of carbonizing the solid matter at a temperature between 800° C. to 1000° C. in a non-oxidizing atmosphere such as argon for 30 to 120 minutes can be implemented as needed. A carbide accordingly obtained becomes silicon carbide by heating at 1350° C. to 2000° C. in an argon atmosphere. The temperature and time for baking can be optionally selected according to the desired characteristics such as the particle size. However, for efficient production, baking at 1600° C. to 1900° C. is preferable.

The particle size of the silicon carbide can be controlled properly by the sintering method, but in an ordinary sintering method, it is preferably small in view of achieving a high density. And thus the baking step is conducted so as to have the particle size of about 0.01 to 20 $\mu$m, further about 0.05 to 2.5 $\mu$m in view of using the silicon carbide particles as the base material. With a particle size smaller than 0.01 $\mu$m, handling in treating processes such as measuring and mixing becomes difficult. On the other hand, with a particle size larger than 20 $\mu$m, high density can not be achieved because the specific surface area is small. That is, the area contacting with adjacent particles is small, and is not preferable.

In general, as a preferable embodiment, silicon carbide particles having a particle size of 0.05 to 1 $\mu$m, a specific surface area of 5 $m^2$/g or more, 1% or less of free carbon, and 1% or less of oxygen content can be preferably used, but it is not limited thereto.

EXAMPLE

The present invention will be explained in further details with reference to examples, but it is not limited thereto.

Example 1

305 g of ethyl silicate as a silicon compound, which is liquid at an ordinary temperature and 142 g of resol type phenol as an organic compound, which generates carbon on heating, were stirred at a rate of about 3000 r.p.m. for 5 minutes. Next, 100 g of or saturated aqueous solution of maleic anhydride (produced by Mitsubishi Kagaku Co., Ltd.) was added to the mixture as a catalyst, and further stirred at a rate of about 3000 r.p.m. for about 15 minutes.

The mixture was cured for about 2 hours at a temperature of 100 to 180° C. The resin type solid matter obtained was given a carbonizing treatment at 900° C. in a nitrogen atmosphere for about 1.5 hours. The C/Si ratio of the heat-treated matter was calculated to be 2.5 from the actual carbon ratio.

The heat-treated matter was finally given a baking treatment at 1800° C. in an argon atmosphere for about 2 hours. It was learned by x-ray diffractions that the silicon carbide particles obtained substantially comprised a β type silicon carbide with an average particle size of about 1.5 μm.

In the above-mentioned carbonizing and baking processes, generation of gas such as SO and $SO_2$ was not observed.

The particles obtained were decomposed by pressure in a strong acid containing hydrofluoric acid and nitric acid and the purity was analyzed with ICP-MS to be found to be as highly pure; impurities except oxygen not exceeding 1 ppm.

Example 2

15 g of ethyl silicate as a silicon compound, which is liquid at ordinary temperatures and 7 g of a resol type phenol as an organic compound, which generates carbon upon heating, were stirred at a rate of about 3000 r.p.m. for 5 minutes. 1.5 g of saturated aqueous solution of acrylic acid (produced by Wako Junyaku Co., Ltd.) was added to the mixture as acatalyst, and further stirred at a rate of about 3000 r.p.m. for about 15 minutes.

The mixture was cured for about 2 hours at a temperature of 100 to 180° C. The resin type solid matter obtained was given a carbonizing treatment at 900° C. in a nitrogen atmosphere for about 1.5 hours. The C/Si ratio of the heat-treated matter was calculated to be 2.5 from the actual carbon ratio.

The heat-treated matter was finally applied with a baking treatment at 1800° C. in an argon atmosphere for about 2 hours. It was learned by X-ray diffraction that the silicon carbide particles obtained substantially comprised a β type silicon carbide with an average particle size of about 1.5 μm.

In the above-mentioned carbonizing and baking processes, generation of gases such as SO and $SO_2$ was not observed.

The purity was analyzed as in Example 1 to be found as highly pure for not including impurities above 1 ppm.

Example 3

24 g of amorphous silica fine particles, 10 g of ethyl silicate as a silicon compound, which is liquid at ordinary temperatures and 8 g of a resol type phenol as an organic compound, which generates carbon upon heating, were stirred at a rate of about 3000 r.p.m. for 5 minutes. 8 g of a saturated aqueous solution of maleic anhydride (produced by Mitsubishi Kagaku Co., Ltd.) was added to the mixture as a catalyst, and further stirred at a rate of about 3000 r.p.m. for about 15 minutes.

The mixture was cured for about 2 hours at a temperature of 100 to 180° C. The resin type solid matter obtained was given a carbonizing treatment at 900° C in a nitrogen atmosphere for about 1.5 hours.

The heat-treated matter was finally given a baking treatment at 1800° C. in an argon atmosphere for about 2 hours. It was learned by X-ray diffraction that the silicon carbide particles obtained substantially comprised a β type silicon carbide with an average particle size of about 0.4 μm.

In the above-mentioned carbonizing and baking processes, generation of gases such as SO and $SO_2$ was not observed.

The purity was analyzed as in Example 1 and found to be highly pure and not including impurities above 1 ppm.

Comparative Example 1

305 g of ethyl silicate as a silicon compound, which is liquid at ordinary temperatures and 142 g of resol type phenol as an organic compound, which generates carbon upon heating, were stirred at a rate of about 3000 r.p.m. for 5 minutes. 26 g of a 50% aqueous solution of p-toluenesulfonic acid (produced by Nakarai Kagaku Co., Ltd.) was added to the mixture as a catalyst, and further stirred at a rate of about 3000 r.p.m. for about 5 minutes.

The mixture was cured for about 1 hour at a temperature of 100 to 180° C. The obtained resin type solid matter was given a carbonizing treatment at 900° C. in a nitrogen atmosphere for about 1.5 hours. The C/Si ratio of the heat-treated matter was calculated to be 2.5 from the actual carbon ratio.

The heat-treated matter was finally given a baking treatment at 1800° C. in an argon atmosphere for about 2 hours. It was learned by X-ray diffraction that the silicon carbide particles obtained substantially comprised a β type silicon carbide with an average particle size of about 1.5 μm.

However, in the above-mentioned carbonizing and baking processes, gases such as SO and $SO_2$ were generated (detected about 280 ppm) and sulfur compounds generated in the carbonizing and baking processes were discharged outside the furnace.

As can be seen from the results of Examples and Comparative Example, silicon carbide of a high quality having a C/Si ratio and an average particle size equally good as those of a conventional method can be obtained by the production method of the present invention without generating gases such as SO and $SO_2$ in the carbonizing and baking processes.

What is claimed is that:

1. A production method of silicon carbide particles comprising:

a step of mixing at least one silicon compound selected from the group consisting of a silica sol, alkoxysilanes and polymers of alkoxysilanes, and which is liquid at room temperature, with an organic compound capable of polymerization or crosslinking having a functional group which generates carbon by heating and is liquid at room temperature and is different from the at least one silicon compound, and with a polymerization or crosslinking catalyst that is different from the at least one silicon compound and different from the organic compound and has a hydrophobic portion that has affinity with the silicon compound and a hydrophilic portion that has affinity with the organic compound which homogeneously dissolves with the organic compound and the at least one silicon compound to obtain a mixture;

a step of homogeneously solidifying the mixture to obtain a solid matter; and a step of heating and baking the solid matter at a temperature of 1600° C. to 1900° C. in a non-oxidizing atmosphere, wherein the catalyst is at least one selected from the group consisting of maleic acid, maleic anhydride, acrylic acid and itaconic acid.

2. The production method of silicon carbide particles according to claim 1, wherein the catalyst is maleic acid and maleic anhydride.

3. The method according to claim 2, wherein said silicon carbide particles have a particle size of 0.05 to 1 µm.

4. The method according to claim 2, wherein said silicon carbide particles have a specific surface area of at least 5 m²/g.

5. The method according to claim 2, wherein said silicon carbide particles comprise 1% or less of free carbon.

6. The method according to claim 2, wherein said silicon carbide particles comprise 1% or less of oxygen.

7. The method according to claim 2, wherein said silicon carbide particles have a particle size of 0.05 to 1 µm and a specific surface area of at least 5 m²/g, and said silicon carbide particles comprise 1% or less of free carbon and 1% or less of oxygen.

8. The production method of silicon carbide particles according to claim 1, wherein the solid matter is heated and carbonized in a non-oxidizing atmosphere in advance, before the steps of heating and baking.

9. The production method of silicon carbide particles according to claim 1, wherein the mixture further contains a surfactant.

10. The production method of silicon carbide particles according to claim 1, wherein the silicon compound is a silicon compound that has an impurity content of 20 ppm or less.

11. The production method of silicon carbide particles according to claim 1, wherein the silicon compound is selected from the group consisting of alkoxy silanes and a polymer of alkoxy silanes.

12. The production method of silicon carbide particles according to claim 11, wherein a silicon oxide which is selected from the group consisting of silicon dioxide and silicon monoxide is added to the mixture.

13. The production method of silicon carbide particles according to claim 11, wherein the alkoxy silane is tetraalkoxy silane.

14. The production method of silicon carbide particles according to claim 11, wherein the polymer of alkoxy silane is selected from the group consisting of a low molecular weight polymer or oligomer, and a silicic acid of a high degree of polymerization.

15. The production method of silicon carbide particles according to claim 8, wherein a silica sol is added to the mixture.

16. The production method of silicon carbide particles according to claim 8, wherein a fine particulate silica is added to the mixture.

17. The production method of silicon carbide particles according to claim 11, wherein the alkoxy silane is selected from the group consisting of methoxy silane, ethoxy silane, propoxy silane and butoxy silane.

18. The production method of silicon carbide particles according to claim 1, wherein the organic compound is a liquid which comprises a saccharide selected from the group consisting of monosaccharides, oligosaccharides and polysaccharides.

19. The production method of silicon carbide particles according to claim 18, wherein the organic compound is a poly saccharide.

20. The production method of silicon carbide particles according to claim 19, wherein the poly saccharide is selected from the group consisting of cellulose and starch.

21. The production method of silicon carbide particles according to claim 1, wherein the organic compound is a liquid which comprises one compound selected from the group consisting of a coal tar pitch, a phenol, a furan, an epoxy, and a phenoxy resin.

22. The production method of silicon carbide particles according to claim 1, wherein the organic compound is selected from the group consisting of a phenol resin, a polyvinyl alcohol and polyvinyl acetate.

23. The production method of silicon carbide particles according to claim 1, wherein the silicon compound is a silicon compound that has an impurity content of 5 ppm or less.

24. The production method of silicon carbide particles according to claim 1, wherein said organic compound is a liquid which comprises one compound selected from the group consisting of monosaccharides, oligosaccharides, polysaccharides, a coal tar pitch, a phenol resin, a furan resin, an epoxy resin, a phenoxy resin, a polyvinylalcohol and a polyvinylacetate.

25. The production method of silicon carbide particles according to claim 1, wherein said at least one silicon compound is alkoxysilane and said organic compound is phenol resin.

26. A production method of silicon carbide particles comprising:

mixing (i) at least one silicon compound selected from the group consisting of a silica sol, alkoxysilanes and polymers of alkoxysilanes, and which is liquid at room temperature, with (ii) an organic compound capable of polymerization or crosslinking having a functional group which generates carbon by heating and is liquid at room temperature and is different from the at least one silicon compound, and with (iii) maleic acid, the maleic acid being a polymerization or crosslinking catalyst that is different from the at least one silicon compound and that is different from the organic compound and has a hydrophobic portion that has affinity with the silicon compound, and a hydrophilic portion that has affinity with the organic compound, and which homogeneously dissolves with the organic compound and the at least one silicon compound to obtain a mixture;

homogeneously solidifying the mixture to obtain a solid matter; and heating and baking the solid matter at a temperature of 1600° C. to 1900° C. in a non-oxidizing atmosphere.

27. The method according to claim 26, wherein the silicon carbide particles have a particle size of 0.05 to 1 µm.

28. The method according to claim 26, wherein the silicon carbide particles have a specific surface area of at least 5 m²/g.

29. The method according to claim 26, wherein the silicon carbide particles comprise 1% or less of free carbon.

30. The method according to claim 26, wherein the silicon carbide particles comprise 1% or less of oxygen.

31. The method according to claim 26, wherein the silicon carbide particles have a specific surface area of at least 5 m²/g, and the silicon carbide particles comprise 1% or less of free carbon and 1% or less of oxygen.

* * * * *